United States Patent
Fegely et al.

(10) Patent No.: US 11,714,005 B2
(45) Date of Patent: Aug. 1, 2023

(54) MEASUREMENT METHOD OF THE TEMPERATURE OF MECHANICAL PART OF A WHEEL END OF AN AUTOMOTIVE VEHICLE AND CORRESPONDING DEVICE

(71) Applicant: Aktiebolaget SKF, Gothenburg (SE)

(72) Inventors: Kenneth C Fegely, Walled Lake, MI (US); Damien Joucgnoux, Mazières de Touraine (FR); Charlotte Vu, Parçay Meslay (FR)

(73) Assignee: Aktiebolaget SKF, Gothenburg (SE)

( * ) Notice: Subject to any disclaimer, the term of this patent is extended or adjusted under 35 U.S.C. 154(b) by 521 days.

(21) Appl. No.: 17/007,657

(22) Filed: Aug. 31, 2020

(65) Prior Publication Data

US 2021/0072090 A1 Mar. 11, 2021

(30) Foreign Application Priority Data

Sep. 11, 2019 (DE) .......................... 102019213799.7

(51) Int. Cl.
| | | |
|---|---|---|
| *G01K 1/02* | (2021.01) | |
| *G01K 1/024* | (2021.01) | |
| *G01K 3/00* | (2006.01) | |
| *G01K 1/14* | (2021.01) | |
| *G07C 5/00* | (2006.01) | |
| *G07C 5/08* | (2006.01) | |
| *G06F 9/54* | (2006.01) | |
| *H04M 1/725* | (2021.01) | |

(52) U.S. Cl.
CPC ............... *G01K 1/024* (2013.01); *G01K 1/14* (2013.01); *G01K 3/005* (2013.01); *G06F 9/547* (2013.01); *G07C 5/008* (2013.01); *G07C 5/0808* (2013.01); *G07C 5/0816* (2013.01); *H04M 1/725* (2013.01)

(58) Field of Classification Search
CPC .......... G01K 1/024; G01K 1/14; G01K 3/005; G01K 2205/00; G06F 9/547; G07C 5/008; G07C 5/0808; G07C 5/0816; G07C 5/08; H04M 1/725; B60C 23/20; G08C 17/02
See application file for complete search history.

(56) References Cited

U.S. PATENT DOCUMENTS

| | | | | |
|---|---|---|---|---|
| 3,805,256 A | * | 4/1974 | Pepin ..................... | H03K 4/502 340/870.18 |
| 4,140,999 A | * | 2/1979 | Conway ................. | G08C 19/12 340/870.18 |
| 4,230,731 A | * | 10/1980 | Tyler .................... | H05B 6/6467 426/243 |

FOREIGN PATENT DOCUMENTS

| | | |
|---|---|---|
| CA | 2200647 A1 | 9/1998 |
| EP | 1256792 A2 | 11/2002 |
| WO | 2005027065 A2 | 3/2005 |
| WO | 2015071022 A1 | 5/2015 |
| WO | 201707214 A1 | 1/2017 |
| WO | 2017072143 A1 | 5/2017 |

* cited by examiner

Primary Examiner — Sizo B Vilakazi
(74) Attorney, Agent, or Firm — Garcia-Zamor Intellectual Property Law, LLC; Ruy Garcia-Zamor

(57) ABSTRACT

Measurement method of the temperature of a mechanical part of a wheel end of an automotive vehicle fitted with a thermal sensor method allowing a high precision measurement and broadcasting of the temperature of a mechanical part in case of an imminent thermal event while saving battery the rest of the time.

8 Claims, 2 Drawing Sheets

MEASUREMENT METHOD OF THE TEMPERATURE OF MECHANICAL PART OF A WHEEL END OF AN AUTOMOTIVE VEHICLE AND CORRESPONDING DEVICE

CROSS-REFERENCE TO RELATED APPLICATIONS

This application claims priority to German Patent Application no. 102019213799.7, filed Sep. 11, 2019, the contents of which is fully incorporated herein by reference.

TECHNICAL FIELD OF THE INVENTION

The present invention relates to measurement devices and methods, and particularly to vehicle measurement devices and methods.

BACKGROUND OF THE INVENTION

During breaking, a lot of kinetic energy is converted in thermal energy. While this event has become overlooked in personal automotive, it can still be an issue in bigger vehicles like trucks, trailer, buses or trains.

In some cases, breaking of such vehicles can lead to a thermal event, threatening the safety of the users and of the vehicle. A thermal event is the term for wheel end fire.

A thermal event can be detected by measuring the temperature of the part involved. However, the duration of a temperature increase leading to a thermal event depends on the product. In some occurrences, such an increase can be quite short and overcome the thermal sensors currently used.

Automotive vehicles are commonly fitted with tire pressure monitoring systems TPMS for monitoring the tire pressure. Some TPMS also perform temperature measurements. However, the temperature measured is the temperature of the air inside the tire which heats differently from the mechanical parts of the wheel. The polling interval of the TPMS is also quite high, generally around 30 mins, which is too high for early detection of a thermal event.

Moreover, TPMS comprise batteries designed to last several years, that are embedded within the system. Because of those constraints, it is not possible to reduce the polling interval without reducing the lifetime of the battery, which cannot be easily replaced.

There is a need for a measurement device and method allowing a high precision measurement and broadcasting of the temperature of a mechanical part in case of an imminent thermal event while saving battery the rest of the time.

From the state of the art, the following means for detection of an increase in temperature are known.

A hub alert is a sticker on a wheel hub, that changes color if a preset threshold temperature is exceeded. The change of color of the ink present on the sticker is progressive because of the chemical reaction involved. Therefore, the hub alert is not a real time solution due to the duration involved in the color change.

Document WO 2005/027065 discloses a wheel end assembly high temperature warning system linked to a TPMS.

Document CA2200647 discloses a heat sensor for tractor trailer axle. The disclosed sensor is a thermal sensor disposed between the axle spindle and the hub and drum sub assembly.

Document WO2017072143 A1 discloses systems and methods for monitoring wheel hub temperatures and odometry in trailer axles, based upon a measurement by a thermocouple in the spindle.

Document EP1256792 discloses a vehicle wheel assembly with temperature indicator. The temperature indicator is assembled into the hub and starts to communicate wirelessly when the temperature exceeds a predefined threshold.

Document WO2015071022 discloses a wheel bearing assembly having a temperature measuring device.

None of those devices allows for finer temperature sensing when the temperature reaches a predefined threshold, in order to detect an imminent thermal event, while enabling battery saving the rest of the time. The technical problem remains unsolved.

SUMMARY OF THE INVENTION

An aspect of the invention is a measurement method of the temperature of a mechanical part such as a wheel end of a vehicle fitted with a thermal sensor, comprising the following steps:

measuring the temperature of the part with the thermal sensor at an initial measurement frequency, broadcasting the measured temperature at an initial broadcast frequency, determining if the last measured temperature is higher that a first preset temperature threshold, if such is the case, the broadcast frequency is changed from the initial broadcast frequency to a higher broadcast frequency and the measurement frequency is changed from the initial measurement frequency to a higher measurement frequency, performing a new measurement of the temperature of the part at the higher measurement frequency, broadcasting the measured temperature at the higher broadcast frequency, if it has been determined that the last measured temperature is lower or equal to the first preset temperature threshold, keeping the broadcast frequency and the measurement frequency unchanged, and resuming at the step of measuring the temperature of the part with the thermal sensor at an initial measurement frequency, after broadcasting the measured temperature at the higher broadcast frequency, determining if the last measured temperature is higher than the first preset temperature threshold, if such is the case, the process resumes at the step of performing a new measurement of the temperature of the part at the higher measurement frequency, if such is not the case, changing the broadcast frequency from the higher broadcast frequency to the initial broadcast frequency, and changing the measurement frequency from the higher measurement frequency to the initial measurement frequency, then resuming the process at the step of measuring the temperature of the part with the thermal sensor at an initial measurement frequency.

The measurement method can comprise further steps after broadcasting of the measured temperature at a broadcasting frequency, said steps forming at least one loop during:

determining if the measured temperature is higher than a preset temperature threshold, if such is the case, increasing the measurement frequency to another measurement frequency and changing the broadcast frequency to another broadcast frequency, measuring the temperature at the other measurement frequency, and broadcasting the temperature at the other broadcasting frequency before starting a new loop, if such is not the case, decreasing the measurement frequency and the broadcast frequency to previous values proceeding with the step of determining if the measured temperature is higher than the preset temperature threshold.

The minimum temperature since the last reset of the sensor and the maximum temperature since the last reset of the sensor are broadcasted along with the measured temperature.

The vehicle can be an automotive vehicle such as truck, a trailer or a bus; it can also be a motorbike or a train.

Another aspect of the invention is a measurement device of the temperature of a mechanical part such as a wheel end of an automotive vehicle comprising processing means, connected to a memory and a thermal sensor, the processing means executing the measurement method as described above, during which the processing means communicates with the thermal sensor to set the measurement frequency and to receive the measurements, the processing means then broadcasting the last measured temperature at the broadcasting frequency and determining the changes in measurement frequency and broadcasting frequency based on comparing the temperature measurement to predetermined thresholds stored in the memory.

The processing means can be wirelessly connected to a human machine interface through which it informs the driver that a thermal event is imminent.

The processing means can be wirelessly connected to communications means so that it can inform a remote server that the measured temperature is higher than at least one of the preset thresholds for further processing or warning of the driver The remote server can communicate with the driver through an application executed on a smartphone.

BRIEF DESCRIPTION OF THE DRAWINGS

The present invention will be better understood from studying the detailed description of a number of embodiments considered by way of entirely non-limiting examples and illustrated by the attached drawing in which.

DETAILED DESCRIPTION OF SOME EMBODIMENTS

Figure 1:
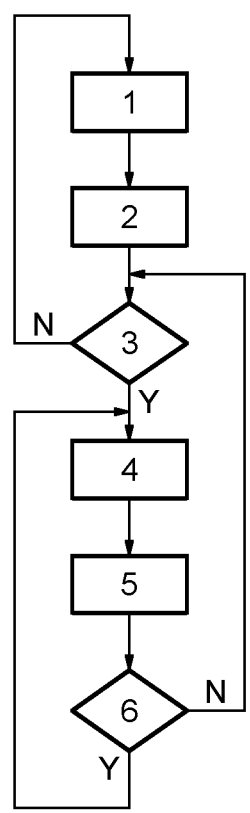
FIG. 1 shows the main steps of a measurement process according to a first embodiment of the invention.

In a particular embodiment, the minimum temperature Tmin since last product reset, the maximum temperature Tmax since last product reset are broadcasted along with the last measured temperature Tcurrent. A reset is performed on the product after a bearing damage is detected. The product can be mounted again on a new wheel or kept on the same wheel after the damaged bearing is changed. In case of a reset the memory is deleted, there is no history of temperature measurements.

In an embodiment, a product is a TPMS like device mounted on the wheel rim.

During a first step 1, a sensor measures the temperature of the part it is fixed to at an initial measurement frequency M1 and broadcasts the measured temperature Tcurrent at an initial broadcast frequency B1 at a second step 2.

At a third step 3, it is determined if the last measured temperature Tcurrent is higher that a first preset temperature threshold T1. If such is the case, the measurement frequency is changed from the initial measurement frequency M1 to a higher measurement frequency M2. Similarly, the broadcast frequency is changed from the initial broadcast frequency B1 to a higher broadcast frequency B2.

During a fourth step 4, the sensor performs a new measurement of the temperature of the part it is fixed to at the higher measurement frequency M2 and broadcasts the measured temperature Tcurrent at the higher broadcast frequency B2 at a fifth step 5. It is to be understood that steps 4 and 5 happen after given durations have lapsed since the measurement at step 1 and the broadcast at step 2 depending respectively from the higher measurement frequency M2 and the higher broadcast frequency B2.

If at the third step 3, it is determined that the last measured temperature Tcurrent is lower or equal to the first preset temperature threshold T1, the broadcast frequency and the measurement frequency are kept unchanged. The process resumes at step 1 then step 2, wherein a new measurement and a new broadcast are performed after given durations have lapsed since the previous measurement at step 1 and the previous broadcast at step 2 depending respectively from the initial measurement frequency M1 and the initial broadcast frequency B1.

After step 5, the process proceeds with a sixth step 6 wherein it is determined if the last measured temperature Tcurrent is higher than the first preset temperature threshold T1. If such is the case, the process resumes at step 4. If such is not the case, the measurement frequency is changed from the higher measurement frequency M2 to the initial measurement frequency M1. Similarly, the broadcast frequency is changed from the higher broadcast frequency B2 to the initial broadcast frequency B1. The process then resumes at step 1 then step 2, wherein a new measurement and a new broadcast are performed after given durations have lapsed since the previous measurement at step 1 and the previous broadcast at step 2 depending respectively from the initial measurement frequency M1 and the initial broadcast frequency B1.

The process described above enables an increase in the measurement and broadcasting frequencies when the measured temperature is above a threshold. With a threshold judiciously chosen, it enables detecting a rise in temperature with high precision while being energy efficient the rest of the time.

As it can be seen, the process is kept in a loop of measurement and broadcasting at a higher frequency until the temperature decreases below the first preset threshold T1.

The number of temperature thresholds and of changes in measurement and broadcasting frequencies can be increased until a real time monitoring is achieved.

Figure 2:
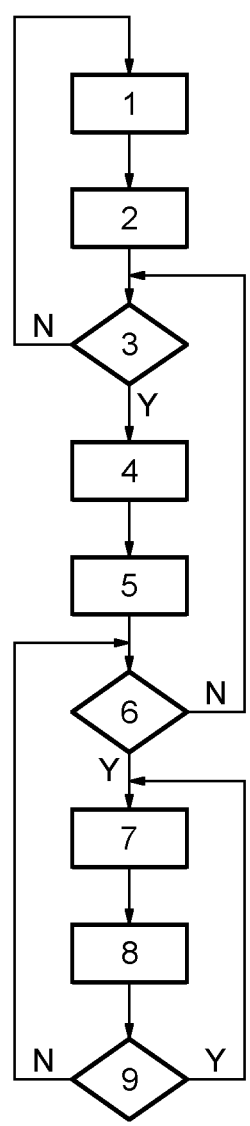
FIG. 2 shows the main steps of a measurement process according to a second embodiment of the invention.

FIG. 2 shows the main steps of the measurement method according to a second embodiment of the invention, wherein the method comprises two thresholds and two changes in frequencies.

During a first step 1, a sensor measures the temperature of the part it is fixed to at an initial measurement frequency M1 and broadcasts the measured temperature Tcurrent at an initial broadcast frequency B1 at a second step 2.

In a particular embodiment, the minimum temperature Tmin since last product reset, the maximum temperature Tmax since last product reset are broadcasted along with the last measured temperature Tcurrent.

At a third step 3, it is determined if the last measured temperature Tcurrent is higher that a first preset temperature threshold T1. If such is the case, the measurement frequency is changed from the initial measurement frequency M1 to a higher measurement frequency M2. Similarly, the broadcast frequency is changed from the initial broadcast frequency B1 to a higher broadcast frequency B2.

During a fourth step 4, the sensor performs a new measurement of the temperature of the part it is fixed to at the higher measurement frequency M2 and broadcasts the measured temperature Tcurrent at the higher broadcast frequency B2 at a fifth step 5. It is to be understood that steps 4 and 5 happen after given durations have lapsed since the measurement at step 1 and the broadcast at step 2 depending respectively from the higher measurement frequency M2 and the higher broadcast frequency B2.

If at the third step 3, it is determined that the last measured temperature Tcurrent is lower or equal to the first preset temperature threshold T1, the broadcast frequency and the measurement frequency are kept unchanged. The process resumes at step 1 then step 2, wherein a new measurement and a new broadcast are performed after given durations have lapsed since the previous measurement at step 1 and the previous broadcast at step 2 depending respectively from the initial measurement frequency M1 and the initial broadcast frequency B1.

After step 5, the process proceeds with a six step 6 wherein it is determined if the last measured temperature Tcurrent is higher that a second preset temperature threshold T2. If such is the case, the measurement frequency is changed from the higher measurement frequency M2 to a second higher measurement frequency M3. Similarly, the broadcast frequency is changed from the higher broadcast frequency B2 to a second higher broadcast frequency B3. The process then proceeds at a seventh step 7.

If at step 6, it is determined that the last measured temperature Tcurrent is lower or equal to that a second preset temperature threshold T2, the frequencies are kept unchanged and the process resumes at step 3.

During step 7, the sensor performs a new measurement of the temperature of the part it is fixed to at the second higher measurement frequency M3 and broadcasts the measured temperature Tcurrent at the second higher broadcast frequency B3 at an eighth step 8. It is to be understood that steps 7 and 8 happen after given durations have lapsed since the measurement at step 4 and the broadcast at step 5 depending respectively from the second higher measurement frequency M3 and the second higher broadcast frequency B3.

After step 8, the process proceeds with a ninth step 9 wherein it is determined if the last measured temperature Tcurrent is still higher than the second preset temperature threshold T2. If such is the case, the process resumes at step 7. If such is not the case, the measurement frequency is changed from the second higher measurement frequency M3 to the higher measurement frequency M2. Similarly, the broadcast frequency is changed from the second higher broadcast frequency B3 to the higher broadcast frequency B2. The process then resumes at step 4 then step 5, wherein a new measurement and a new broadcast are performed after given durations have lapsed since the previous measurement at step 7 and the previous broadcast at step 8 depending respectively from the higher measurement frequency M2 and the higher broadcast frequency B2.

The second embodiment of the process described above enables successive increases in the measurement and broadcasting frequencies when the measured temperature rises past successive thresholds. With thresholds judiciously chosen, it enables detecting a rise in temperature with an increasing precision while being energy efficient the rest of the time.

As it can be seen, the process is kept in a loop of measurement and broadcasting at increasing frequencies until the temperature decreases below the different preset threshold T1 and T2.

As previously stated, the present example is given with two thresholds and two changes in frequencies. However, higher numbers of threshold and changes in frequencies are in the scope of the present invention.

A measurement device according to the invention comprises a thermal sensor connected to processing means both embedded or affixed to a product. The processing means are connected to a memory.

The processing means execute the measurement method described above during which it communicates with the thermal sensor to set the measurement frequency and to receive the measurements, and broadcasts wirelessly at the broadcasting frequency.

The processing means determines the changes in measurement frequency and broadcasting frequency based on comparing the temperature measurement to predetermined thresholds stored in the memory.

In an embodiment, the processing means are wirelessly connected to a human machine interface HMI through which it informs the driver that a thermal event is imminent.

In another embodiment, the processing means are wirelessly connected to communications means so that it can inform a remote server that the measured temperature is higher than at least one of the preset thresholds for further processing or warning of the driver. In a particular embodiment, the remote server communicates with the driver through an application loaded on a smartphone.

The preset temperature thresholds are saved inside the product during its configuration. The configuration is done before using the product on the vehicle and is mandatory for product usage.

The invention claimed is:

1. Measurement method of the temperature of a mechanical part such as a wheel end of an automotive vehicle fitted with a thermal sensor, comprising the following steps:
   measuring the temperature of the part with the thermal sensor at an initial measurement frequency,
   broadcasting the measured temperature at an initial broadcast frequency,
   determining if the last measured temperature is higher that a first preset temperature threshold, so that
      i) if such is the case, the broadcast frequency is changed from the initial broadcast frequency to a higher broadcast frequency and the measurement frequency is changed from the initial measurement frequency to a higher measurement frequency,
         performing a new measurement of the temperature of the part at the higher measurement frequency,
         broadcasting the measured temperature at the higher broadcast frequency,
      ii) if it has been determined that the last measured temperature is lower or equal to the first preset temperature threshold, keeping the broadcast frequency and the measurement frequency unchanged, and resuming at the step of measuring the temperature of the part with the thermal sensor at the initial measurement frequency,
         after broadcasting the measured temperature at the higher broadcast frequency, determining if the last measured temperature is higher than the first preset temperature threshold, so that i) if such is the case, the process resumes at the step of performing a new measurement of the temperature of the part at the higher measurement frequency, ii) if such is not the case, changing the broadcast frequency from the higher broadcast frequency to the initial broadcast frequency, and changing the measurement frequency from the higher measurement frequency to the initial measurement frequency, then resuming the process at the step of measuring the temperature of the part with the thermal sensor at an initial measurement frequency.

2. Measurement method according to claim 1, comprising further steps after broadcasting of the measured temperature at a broadcasting frequency, said steps forming at least one loop during:

determining if the measured temperature is higher than a preset temperature threshold,
  i. if such is the case, increasing the measurement frequency to another measurement frequency and changing the broadcast frequency to another broadcast frequency, measuring the temperature at the other measurement frequency, and broadcasting the temperature at the other broadcasting frequency before starting a new loop,
  ii. if such is not the case, decreasing the measurement frequency and the broadcast frequency to previous values proceeding with the step of determining if the measured temperature is higher than the preset temperature threshold.

3. Measurement method according to any of the preceding claims, wherein the minimum temperature since the last reset of the sensor and the maximum temperature since the last reset of the sensor are broadcasted along with the measured temperature.

4. Measurement method according to claim 1, wherein the automotive vehicle is a truck, a trailer or a bus.

5. Measurement device of the temperature of a mechanical part of a wheel end of an automotive vehicle comprising processing means connected to and a thermal sensor, the processing means executing the measurement method as claimed in claim 1, during which the processing means communicates with the thermal sensor to set the measurement frequency and to receive the measurements, the processing means then broadcasting the last measured temperature at the broadcasting frequency and determining the changes in measurement frequency and broadcasting frequency based on comparing the temperature measurement to predetermined thresholds stored in the memory.

6. Measurement device according to claim 5, wherein the processing means are wirelessly connected to a human machine interface through which it informs the driver that a thermal event is imminent.

7. Measurement device according to claim 5, wherein the processing means are wirelessly connected to communications means so that it can inform a remote server that the measured temperature is higher than at least one of the preset thresholds for further processing or warning of the driver.

8. Measurement device according to claim 7, wherein the remote server communicates with the driver through an application executed on a smartphone.

* * * * *